United States Patent [19]

Torberger

[11] 4,391,676

[45] Jul. 5, 1983

[54] ARRANGEMENT FOR PASSING A FIRST LIQUID CLOSE TO, BUT WITHOUT MIXING IT WITH A SECOND LIQUID, FOR EXAMPLE AN ARRANGEMENT FOR SEA WATER DESALINATION

[76] Inventor: Finn Torberger, Örnstigen 2, 183 50 Täby, Sweden

[21] Appl. No.: 325,430

[22] PCT Filed: Mar. 10, 1981

[86] PCT No.: PCT/SE81/00076

§ 371 Date: Nov. 19, 1981

§ 102(e) Date: Nov. 19, 1981

[87] PCT Pub. No.: WO81/02729

PCT Pub. Date: Oct. 1, 1981

[30] Foreign Application Priority Data

Mar. 24, 1980 [SE] Sweden .............................. 8002233

[51] Int. Cl.³ ............................................. B01D 3/02
[52] U.S. Cl. .................................... 202/173; 55/158;
159/17 R; 159/DIG. 27; 202/235; 202/236
[58] Field of Search ............ 203/10, 11, 89, DIG. 17,
203/99; 202/236, 266, 235, 233, 270, 267 R, 267
A, 172–174; 159/1 R, 5, 13 R, 13 A, 13 B, 14,
15, 17 R, 47 R, 49, DIG. 27, DIG. 28, DIG. 41;
55/16, 158; 210/490, 500.2, 634, 637, 640

[56] References Cited

U.S. PATENT DOCUMENTS 3,797,202  3/1974  Nevlander et al. .................... 55/158
4,265,713  5/1981  Cheng .................................... 203/10

Primary Examiner—Frank Sever

Attorney, Agent, or Firm—Silverman, Cass & Singer, Ltd.

[57] ABSTRACT

An arrangement for permitting a first liquid to flow close to a second liquid, but without being intermixed therewith, includes a first plurality of plates (12) and a second plurality of plates (12), which are located between plates in the first plurality of plates but spaced therefrom by means of separating pieces. Each separating piece includes a frame formed about plate-shaped plane-parallel partial pieces, viz. an outer porous and hydrophobic plastic diaphragm, an intermediate distance network of plastic and an outer thin plastic foil. The frame includes infeed holes for air and outfeed holes for water.

The voids of the plastic diaphragm have a radius within the range of 2 to 5 μm. The distance network has a thickness of 1 to 2 mm and consists of intersecting strips. The plastic foil has a thickness of about 0.1 mm.

The plates include a frame with four through holes, of which two holes have connection to a recess in the plate, while the other two holes have no such connection. The plates in the two pluralities of plates are so turned that holes with connection in the first plurality of plates correspond to holes without connection in the remaining plurality of plates.

The frames of the separating pieces include four through holes (131, 132, 133, 134) corresponding to the holes of the plates.

Inflow means (101, 103) and, respectively, outflow means (104, 102) are connected to respective holes (111, 123; 114, 122) with connection in the two pluralities of plates.

3 Claims, 6 Drawing Figures

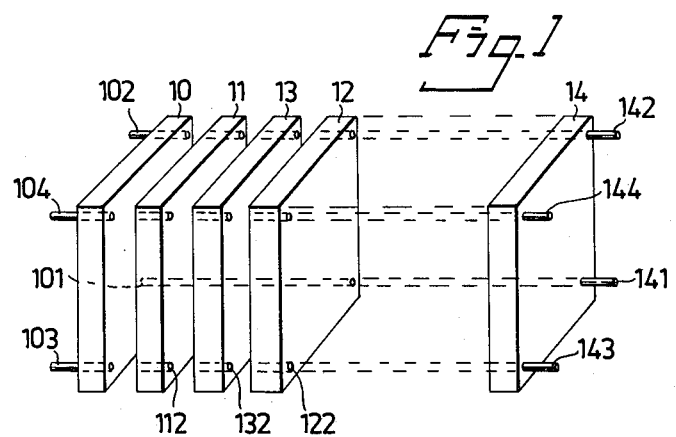
Fig. 1
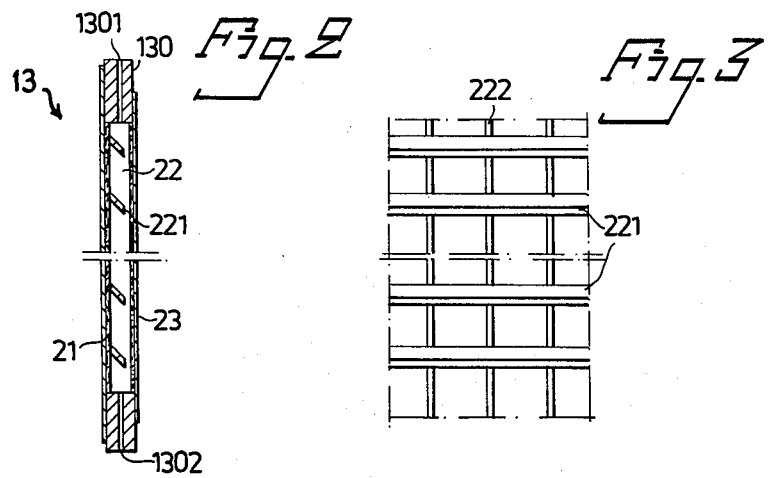
Fig. 2
Fig. 3
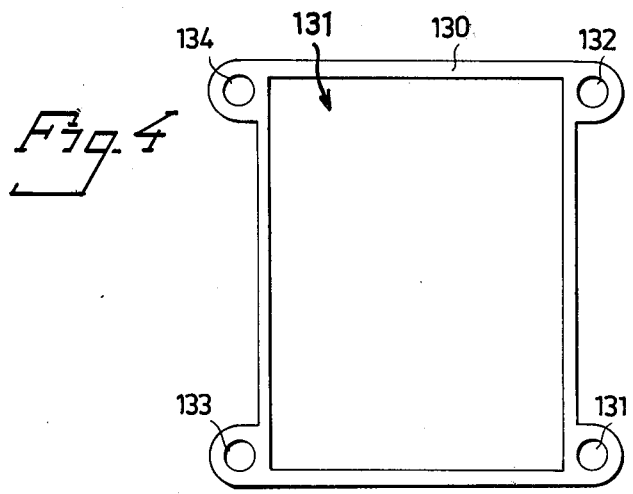
Fig. 4

4,391,676

ARRANGEMENT FOR PASSING A FIRST LIQUID CLOSE TO, BUT WITHOUT MIXING IT WITH A SECOND LIQUID, FOR EXAMPLE AN ARRANGEMENT FOR SEA WATER DESALINATION

BACKGROUND OF THE INVENTION

This invention relates to an arrangement for permitting a first liquid to flow close to a second liquid, but without being mixed therewith, in order, for example, to recover freshwater by distillation of sea water or to transfer heat from a relatively hot liquid to a relatively cold liquid. The arrangement is of a kind which comprises a first number of plates intended for the first liquid, and a second number of plates intended for the second liquid, which are located between, but separated from plates in the first number of plates. All plates are well separated from each other by means of special separating pieces located between each two of said plates.

PRIOR ART

It is previously known to recover freshwater from sea water by low-temperature distillation, see e.g. SE-PS No. 387 927, in which an arrangement is disclosed which comprises a plurality of plane-parallel plates, in every second one of which relatively cold freshwater flows and in every other second one of which relatively warm, solar-heated sea water flows.

It is necessary that the plates with sea water and, respectively, freshwater flow therein are separated from each other, in order to prevent intermixing of the two flows. The said patent specification describes distance members, which consist of grooves turned upside down, and it also describes special means for distributing the liquids to the different plates and corresponding collecting means.

The object of the present invention is to provide devices of the aforementioned kind but so modified that a higher efficiency is achieved through a simplified and more compact construction.

SUMMARY OF THE INVENTION

The invention relates to a special design of said separating pieces, in such a manner, that each of the pieces comprises an outer porous hydrophobic plastic diaphragm, the voids of which have such a radius that at the hydrostatic pressures prevailing in the arrangement liquid water passage through the plastic diaphragm is prevented, while passage of water vapour is rendered possible; an intermediate distance network of plastic and an outer thin plastic foil, all clamped in a frame, which in its upper portion is provided with inlet apertures for air and in its lower portion with outlet apertures for water.

The invention also relates to a special design of the two numbers of plates, in such a manner, that they are adapted together with the separating pieces to be assembled to one unit, which is provided with separate inflow and outflow means for the two liquids.

The characterizing features of an arrangement according to the invention are apparent from the attached claims.

BRIEF DESCRIPTION OF THE DRAWINGS

The invention is described in greater detail with reference to the accompanying drawings, in which FIG. 1 schematically shows the location of plates and separating pieces relative to each other and supply and discharge means, FIG. 2 is a sectional lateral view of a separating piece, FIG. 3 is a front view of a portion of a distance network comprised in a separating piece, and FIGS. 4, 5, 6 are front views of the frame configuration of a separating piece, of a plate in a first number of plates and of a plate in a second number of plates.

Figure 5:
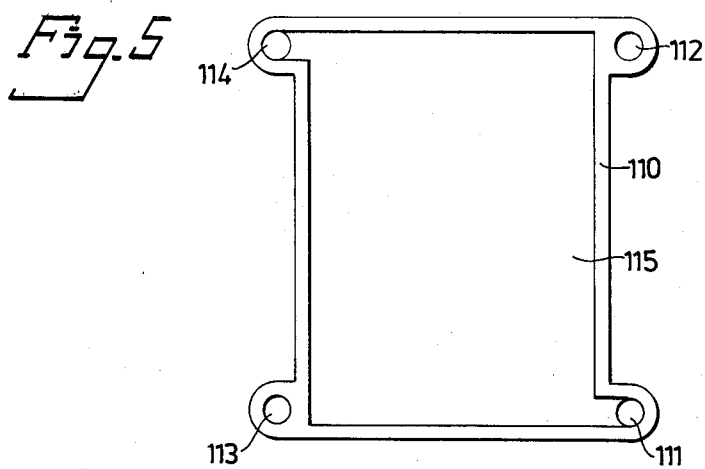

The arrangement according to FIG. 1 comprises a plurality of plates prior in their mechanical assembly to one unit. An outer plate 10 includes a first supply means 101, a second supply means 103, a first discharge means 104 and a second discharge means 102. A second outer plate 14 includes corresponding supply means 141,143 and discharge means 144,142. Between said outer plates a first plurality of plates 11, a second plurality of plates 12 and separating pieces 13 are located. The drawing shows only one plate 11, one plate 12 and one separating piece 13, but in reality there are a great number of plates 11 that are spaced from an equal number of tightly abutting plates 12 by means of separating pieces 13, the plates being interleaved one another.

As appears in FIG. 2, a separating piece 13 comprises a frame 130 receiving plate-shaped mutually plane-parallel partial pieces, viz. an outer porous hydrophobic (water repellant) plastic diaphragm 21, an intermediate distance network 22 of plastic and an outer thin plastic foil 23. The frame 130 includes in its upper portion inlet holes 1301 for air and in its lower portion outlet holes 1302 for water.

The plastic diaphragm 21 consists of a porous material with void radii dimensioned to be within the range 2 to 5 micrometers.

The distance network 22 comprises vertical strips 222, see also FIG. 3, and perpendicularly thereto slightly downwardly and outwardly directed cross-strips 221. The network has a thickness of about 1 and 2 mm, and the extension of the cross-strips 221 perpendicularly to their vertical strips 222 is about 0.5 to 1 millimeters.

The ratio of the distance between the cross-strips 221 and the distance between the vertical strips 222 preferably is chosen to be about 20, for example the cross-strip distance is equal to 50 millimeters, and the vertical strip distance is equal to 2 to 4 mm.

The plastic foil 23 consists of polyethylene and has a thickness of about 0.1 mm.

As appears from FIG. 4, the frame 130 for a separating piece 13 is provided with four through holes 131,132,133,134. These holes have no connection to the space 131 defined by the frame and intended for the partial pieces 21,22, 23.

FIG. 5 shows a plate 11 of said first plurality of plates. Said plate 11 consists of a frame 110 with four through holes 111,112,113 and 114 in the periphery of the frame.

Two of said holes, viz. the holes 111 and 114, have connection to a depression of recess 115 extending over a large part of the plate, while the remaining holes 112,113 have no such connection.

Figure 6:
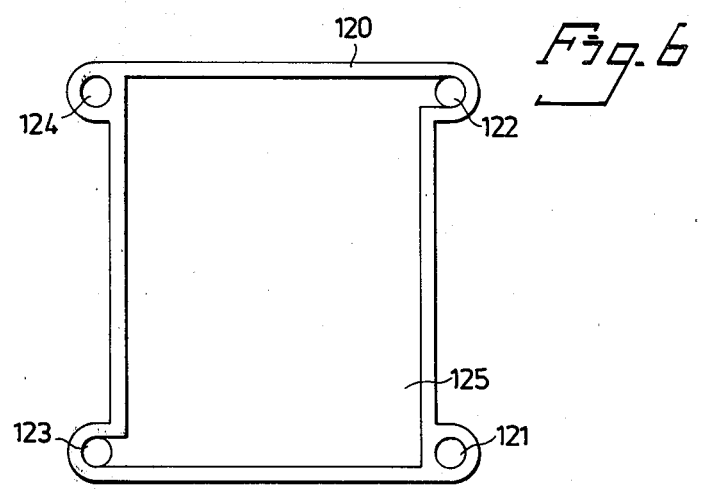

FIG. 6 shows a plate 12 of said second plurality of plates. This plate 12 consists of a frame 120 with four through holes 121,122,123,124 in the periphery of the frame.

The holes 122 and 123 have connection to a depression or recess in the plate, while the holes 121 and 124 have no such connection.

The plates 11 and 12 are identical relative to each other, but are so turned in relation one to the other that holes 122,123 with connection to the depression of the plate in plate 12 correspond to holes 112,113 without connection to the depression of the plate in plate 11. As a direct consequence, the holes 111,114 in the plate 11 correspond to the holes 121 and 124 in the plate 12.

The separating pieces 13 prevent direct intermixing of, for example, relatively warm sea water with relatively cold freshwater for the production of freshwater by distillation of the sea water.

The porous hydrophobic plastic diaphragm 21 is located between the plate 11 for the warm sea water and the distance network 22 and has the object to permit the passage of water vapour while preventing the passage of liquid water.

The distance network 22 has the object to provide an air gap between the diaphragm 21 and the plastic foil 23.

The plastic foil 23 has the object to act as a condensation surface.

The plastic diaphragm 21, the plastic foil 23 and the distance network 22 provide an air gap so that a detached condensation chamber is formed where the water vapour is condensed and which has no contact with the warm water side nor with the cold water side. This implies in principle that both the warm water side and the cold water side can be charged with sea water. Owing to the design of the separating piece, there will be no risk that the plastic diaphragm is depleted of air and entirely or partially filled with liquid. The plastic foil 23 shall be so thin that the condensation heat easily can be conducted away by the cold liquid. A uniform water contact against the foil is obtained when the foil is dull finished.

I claim:

1. An arrangement providing a first liquid to flow close to a second liquid but without the liquids being intermixed, for example for the recovery of freshwater by distillation of sea water and for the transfer of heat from a relatively warm liquid to a relatively cold liquid, comprising:
   A. a first plurality of plates carrying the first liquid;
   B. a second plurality of plates carrying the second liquid, the second plurality of plates being placed interleaved between but separated from the first plurality of plates; and
   C. separating pieces located between and separating the first and second plurality of plates from one another, each separating piece including a frame which receives plate-shaped mutually plane-parallel partial pieces that include:
      1. an outer porous and hydrophobic plastic diaphragm with void radii dimensioned to prevent the passage of liquid water through the plastic diaphragm at the hydrostatic pressures prevailing in the arrangement while rendering possible the passage of water vapor,
      2. an outer thin plastic foil, and
      3. an intermediate distance network located between the diaphragm and the foil positioned and dimensioned to maintain an airgap therebetween so that the plastic diaphragm will be supplied constantly with air and will be free of air depletion or partial filling of liquid, said frame further being provided in its upper portion with inflow holes for air to pass to said airgap, and in its lower portion with outflow holes for water condensed in said airgap.

2. The arrangement of claim 1 in which radii of said voids are in the range of 2 to 5 micrometers, the distance network has a thickness of approximately 1 to 2 millimeters and includes vertical strips and cross strips perpendicular thereto, the cross strips being slightly downwardly and outwardly directed and extending approximately 0.5 to 1 millimeter perpendicular to the vertical strips, and the plastic foil has a thickness of about 0.1 millimeter and consists of polyethylene.

3. The arrangement of claim 1 in which each of the plates of the first plurality of plates comprises a frame with four through holes in the periphery of the frame, two of the holes are connected to a recess extending over a large part of the plate while the two other holes are unconnected to said recess, each of the plates of the second plurality of plates comprises a frame with four through holes in the periphery of the frame, two of the holes are connected to a recess extending over a large part of the plate while the two other holes are unconnected to said recess, the plates of the first and second pluralities being oriented to one another so that the connected holes of the plates of the second plurality are aligned with the unconnected holes in the first plurality of plates and the connected holes of the first plurality of plates are aligned with the unconnected holes of the second plurality of plates, and the peripheries of the frames of the separating pieces are provided with four through holes aligned with the four holes of the first and second plurality of plates, the pluralities of plates and separating pieces are mechanically held together to form a liquid tight unit, the arrangement further including first inflow means for supplying the first liquid to said connecting holes in the first plurality of plates, second inflow means for supplying the second liquid to said connected holes in the second plurality of plates, first outflow means for exhausting the first liquid from said connected holes in the first plurality of plates and second outflow means for exhausting the second liquid from said connected holes of the second plurality of plates.

* * * * *